United States Patent
Ehlerding

(10) Patent No.: US 8,260,443 B2
(45) Date of Patent: Sep. 4, 2012

(54) METHOD FOR THE OPTIMIZED MOVEMENT CO-ORDINATION OF MEASURING MACHINES OR MACHINE TOOLS WITH REDUNDANT AXLES HAVING A TRANSLATORY ACTION

(75) Inventor: Andreas Ehlerding, Seeize (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 265 days.

(21) Appl. No.: 12/643,332

(22) Filed: Dec. 21, 2009

(65) Prior Publication Data

US 2010/0146802 A1 Jun. 17, 2010

Related U.S. Application Data

(63) Continuation of application No. PCT/EP2008/004966, filed on Jun. 20, 2008.

(30) Foreign Application Priority Data

Jun. 22, 2007 (DE) .......................... 10 2007 028 934

(51) Int. Cl.
*G05B 19/18* (2006.01)
*G05B 19/29* (2006.01)
*G06F 19/00* (2006.01)
*G01B 5/004* (2006.01)
*B25J 9/16* (2006.01)
*B25J 9/10* (2006.01)
*B23K 26/02* (2006.01)

(52) U.S. Cl. ......... 700/61; 700/166; 33/503; 318/568.1; 318/568.17; 318/569; 318/600; 219/121.79

(58) Field of Classification Search ............. 700/61, 700/166; 33/503; 318/568.1, 568.17, 569, 318/600; 219/121.79
See application file for complete search history.

(56) References Cited

U.S. PATENT DOCUMENTS 5,574,348 A * 11/1996 Ehlerding ................ 318/575
(Continued)

FOREIGN PATENT DOCUMENTS

DE 4123323 1/1993
(Continued)

OTHER PUBLICATIONS

International Search Report from corresponding PCT Application No. PCT/EP2008/004966, received Dec. 5, 2009, 15 pages.

(Continued)

*Primary Examiner* — Charles Kasenge
*Assistant Examiner* — Jason Lin
(74) *Attorney, Agent, or Firm* — Fish & Richardson P.C.

(57) ABSTRACT

A method for the optimized movement co-ordination of measuring machines or machine tools having redundant axles having at translatory action, wherein the longer partial axles in each case permit a relatively slowly accelerated partial movement over a relatively large measuring or processing space and the shorter partial axles in each case essentially carry out the movement components of a total movement at a substantially altogether constant measuring or processing speed, which require an acceleration beyond a maximum set or stipulated for the respective longer partial axles, wherein, when approaching positions that in an undivided movement would otherwise not be attainable, the base axles correspondingly decelerate and can even come to a complete standstill, wherein by simultaneous displacement of the neutral starting point of the additional axles, the respective movement component of the base axles missing from the total movement is compensated.

10 Claims, 2 Drawing Sheets

U.S. PATENT DOCUMENTS

| | | | |
|---|---|---|---|
| 5,801,939 A | 9/1998 | Okazaki | |
| 6,617,544 B1* | 9/2003 | Tsukamoto et al. | 219/121.79 |
| 6,825,439 B2* | 11/2004 | Leibinger et al. | 219/121.67 |
| 7,859,214 B2* | 12/2010 | Fujibayashi et al. | 318/569 |
| 8,024,067 B2* | 9/2011 | Sakai et al. | 700/245 |
| 2002/0108939 A1* | 8/2002 | Mayer | 219/121.79 |
| 2003/0222065 A1* | 12/2003 | Leibinger et al. | 219/121.79 |
| 2006/0176002 A1 | 8/2006 | Scholich-Tessmann | |
| 2007/0040527 A1* | 2/2007 | Cardinale et al. | 318/575 |

FOREIGN PATENT DOCUMENTS

| | | |
|---|---|---|
| EP | 0594699 | 5/1994 |
| EP | 1366846 | 12/2003 |
| EP | 1294544 | 8/2005 |
| EP | 1688807 | 8/2006 |
| EP | 1758003 | 2/2007 |
| WO | 9629634 | 9/1996 |
| WO | 2006075209 | 7/2006 |

OTHER PUBLICATIONS

Notification Concerning Transmittal of International Preliminary Report on Patentability for corresponding PCT Application PCT/EP2008/004966, issued Dec. 22, 2009, 10 pages, along with the Notification of Transmittal of Translation of the International Preliminary Report on Patentability, issued Jan. 12, 2010, 10 pages.

* cited by examiner

METHOD FOR THE OPTIMIZED MOVEMENT CO-ORDINATION OF MEASURING MACHINES OR MACHINE TOOLS WITH REDUNDANT AXLES HAVING A TRANSLATORY ACTION

CROSS REFERENCE OF RELATED APPLICATIONS

This application is a continuation of and claims priority under 35 U.S.C. §120 to PCT/EP2008/004966, filed on Jun. 20, 2008, and designating the U.S., which claims priority under 35 U.S.C. §119 to German Patent Application No. 10 2007 028 934.2, filed on Jun. 22, 2007. The contents of both the prior applications are hereby incorporated by reference in their entirety.

TECHNICAL FIELD

In the development of measuring tools and machine tools, use is increasingly being made of redundant axles having a translatory action, that is, axles which, being based upon one another or effective against each other, are movable parallel in space relative to one another, wherein one or more additional axles having a relatively short range of movement are arranged on or opposite base axles having a relatively long range of movement. Such axles movable redundantly and superimposed in the same direction provide an opportunity to combine the relatively large range of movement of the base axles with the higher acceleration potentials of additional short-range and therefore light-weight axles, in a continuous movement sequence of a measuring device or a tool relative to a material to be measured or processed.

BACKGROUND

An example of such a concept is the patent EP 594 699 B1 (Ehlerding). The said patent proposed to use parallel oriented, actively superimposed axle arrangements in order to allow the high acceleration of light-weight, short-range axles in the entire working space of less acceleratable long-range axles in machine tools that are preferably designed for processing two-dimensional or flat workpiece in two or three axes oriented orthogonally relative to one another.

From this publication is it known that shorter partial axles, called additional axles here, can be carried by a gantry movable over the material and having a motion unit carrying the additional axles, which motion unit in turn moves along the gantry, or the material also can be moved by means of base axles, in which case a tool is able to move by means of additional axles, again independently of the movement by the base axles, relative to the material. It is just as conceivable to move one or more tool-carrying additional axles along a fixed gantry, as a base axle, over the material, whilst the material is moved along and beneath the gantry by means of a further base axle oriented orthogonally to the gantry.

It is common knowledge that instead of a gantry also a cross member or a movable or stationary arm or extension arm having a mobile or stationary bearer may serve as the support for additional axles, and that notwithstanding the conventional case, in which the base axles preferably move the heavy machine parts or the heavy material to be measured or processed in the horizontal plane, all the said axle configurations may also have a different orientation in space. Instead of the measuring devices or tools, a lightweight or small material to be measured or processed can be carried by the additional axles and by joint movement of base and additional axles can be guided along measuring devices or tools without a fundamentally different co-ordination being required for this.

Furthermore, it is known, for example from WO 2006/75209 A2 (Gattiglio et al), that additional axles may indeed be physically oriented orthogonally relative to one another and move jointly in a plane that is aligned with two base axles, but so that in this plane of movement the physical additional axles are not oriented parallel to the base axles, for example, as in WO 2006/75209 A2, rotated through 45° with respect to the base axles in the common plane of movement.

A redundant, parallel oriented action of the axles is basically also easy to implement here, as the fixed transformation required for this between the alignments of two Cartesian co-ordinate systems oriented to the physical axial directions is to be provided by means of very simple, constantly-acting analogue, digital or computer-generated multiplication elements without any problems for the average person skilled in the art.

Furthermore, it is known from the prior art that instead of linearly moved additional axles, it is also possible to use devices rotatable through a usually small angular amount, so that by means of an adequate distance between centre of rotation and measuring or processing point, a sufficiently approximately linear movement of the elements of a measuring device or a tool relevant to the measurement or processing occurs. A variant of this is used when bundled radiation energy, mainly a laser beam, is directed by means of pivotable mirrors or other deflecting elements onto a processing point. Additional axles in this sense are dealt with in detail for example, in the document WO 96/29634 A1 (Cutler et al), see in this context the illustrations in particular of FIG. 2 and FIG. 4 of that publication. Similar mechanical conditions pertaining to the additional axles are also possible for other tools, for example, rotatable milling heads, or corresponding measuring devices, in which case often additionally a movement along the tool axis or, for example, a measuring sensor axis is possible, also for compensating for the variation from a movement exactly parallel to the particular base axle.

The patent specification EP 1 294 544 B1 (Sartorio) discloses a further configuration and as an improvement over the prior art proposes a parallel kinematic combination, linearly movable in two axes, of the highly acceleratable additional axles, which in particular gives rise to the advantage that in the two horizontal main directions of movement of a machine designed in this manner the kinematic conditions are in this respect comparable, which can improve the efficiency of a two-dimensional tool movement.

Little is disclosed about the practical co-ordination of the simultaneously driven axles, however. Only a few essential general requirements are mentioned, which are intended to apply to the coordination of the partial axles. EP 1 294 544 B1 provides some information about this from paragraph [24] to paragraph [39] of the description and in the main claim. The only information that can be derived from this section of the description teaches us that the maximum speed of the base axles has to be substantially higher than the tool speed, and that from the said conditions and the assumption of known machine data it is possible to set up the necessary equations to determine the as yet unknown machine data.

Evidently based on this still incomplete teaching, EP 1 758 003 A1 (Cardinale et al) proposes first a co-ordination of the axles, which according to the principle of inverse kinematics is intended to make optimum use of the redundant degrees of freedom of a motion mechanism by applying a special form of what is known as the Jacobi matrix. All the remarks relating to this are kept so general that it does not even become sufficiently clear just how important specific limiting conditions in such a process would be, let alone what conditions would be essential for this in order actually to obtain unambiguous solutions of practical use for co-ordination of the axles. Nor is a specific reference to this made in the further description, the examples and the claims, although, for example, basically in all of the adequately substantiated application examples, in particular also in the case of the laser cutting machine concerned, a corresponding explanation would be possible, even if not necessary. To the extent that this ought to serve, for example, also for rotatory axles or even redundantly operating rotatory axles, in order to indicate that the claimed invention can also be adapted to complexly configured systems, then this has not been done in a manner that allows an adaptation at all, without further inventive steps. Compared with the known prior art, in point of fact nothing is disclosed that the skilled person would not already know. Firstly, a distribution of movement to redundantly operating axles by filtering is not in any way an innovation, and the fact that as this happens the additional axles (are intended to) execute as their movement the difference between the total movement and the movement of the base axles, is not really unexpected. Otherwise, the publication if anything repeats what could basically already be read in EP 1 294 544 B1: the maximum speed of the base axles should be selected to be clearly higher than that of the additional axles. (See EP 1 758 003 A1, description, paragraph 32 and claim 9).

As far as specifically comprehensible at all, since it also remains unclear how not only acceleration or amplitude components of a movement but equally whole contours or individual sections shall be "filtered", this teaching ultimately corresponds only to the prior art, for example, from EP 594 699 B1, albeit in an expansion of the claims to virtually every kind of controllable physical variable, which need not be of further interest here.

Nevertheless, it is listed as prior art here because it documents the prior art precisely by way of example with respect to one of the problems to be solved, that is to say: one aspect of the present invention also to be described here is how the efficient execution of movement by additional axles can be especially efficiently co-ordinated at a number of relatively small contours within a more comprehensive overall processing. EP 1 758 003 A1 proposes for this purpose to "filter" this movement, which does not represent a reproducible technical teaching for inherently closed contours, but in conjunction with the use of synchronously redundantly operating axles does show very clearly the need for a corresponding solution, which would be as generally applicable as the word "filter" sounds and at the same time offers an efficient co-ordination of the axis movements.

A relatively simple possible variant to this, but which is less suited to using the potential of synchronously redundantly operating axles since it relates expressly to an alternating use of base and additional axles, is described in EP 1 366 846 B1 (Leibinger et al). See in particular FIG. 9 there.

Correspondingly, according to the prior art it is assumed that the skilled person knows how a discrete contour within an overall processing operation is distinguished, identified, and dimensionally determined.

In actual fact, a large number of variants in this respect are known to the skilled person or are easily conceivable, which mainly ultimately add up to an at least simplified preliminary simulation of the machining, which determine the position and dimensions of individual closed trajectories by means of minimum and maximum value acquisitions in all relevant machine axes and allocate the data thus obtained, for example, by means of a special code or as an annotation, to the generated CNC program of a specific section. In exactly the same way it is also possible for such steps within a preliminary processing to take place initially in a control system, where the values obtained are then mostly only temporarily filed and used in the memory of the control system. The fact that corresponding data about separable contours can be present may therefore, according to the prior art, be taken for granted.

But although it easily becomes plain how the co-ordination of the base and additional axles in EP 1 366 846 B1 may be envisaged, in EP 1 758 003 A1 this remains entirely shrouded in mystery in respect of individual contours, unless one assumes that the process concerned is similar to that in EP 1 366 846 B1, that is, 1. identification of a suitable partial contour, 2. optional positioning of the base axles to a suitable starting position, 3. execution of the identified partial contour by means of the additional axles. If, in addition, a coordinated motion, superimposed for reasons of efficiency, to and from these identified partial contours is provided, that is, in such a way that also a readjustment of the additional axles to their respective starting position, or perhaps also the start or the remainder of a processing procedure by means of or with the aid of the additional axles is performed, even while the base axles are moving, this can surely not be regarded as reproducibly paraphrased for the skilled person with the use of the term "filtering" and vague indications that one can use the Jacobi matrix if problems arise—quite apart from the question of novelty.

In a recently filed patent application of the applicant of the present invention, a variant of redundant axle arrangements having a translatory action is described, which basically does not require an identification of such partial contours to be handled by the additional axles, since by means of the proposed design of machines or a corresponding method, any contour can be worked off at the maximum possible acceleration of the additional axles without any differentiation being required (hereafter called Method 1).

A further previously filed patent application of the applicant of the present invention describes a method of achieving at least a considerably improved suitability of the additional axles with a maximum acceleration also for less conveniently designed machines. This method for optimizing axle co-ordination also manages without the division of a total measurement or processing operation into separate partial contours (hereafter called Method 2).

But, in contrast to Method 1 (which is not applicable to every machine or not always with the necessary speeds), the co-ordination of the axles for any contour with virtually equal efficiency cannot be achieved with Method 2. In particular when many relatively small partial contours are distributed over a relatively large surface, an automatically highly optimized co-ordination of the axles can generally not be guaranteed with Method 2, so that even the very much simpler method from EP 1 366 846 B1 may in such specific cases be at least similarly efficient. But these two methods (Method 2 and EP 1 366 846 B1) come off especially badly where a lot of contours to be dealt with separately are arranged close together, as Method 2 is unable to identify and deal with these contours with discrimination and EP 1 366 846 B1 is unable to co-ordinate the frequent position changes of the base axles in time with a kinematically quite possible beginning or end of a partial treatment.

Even though the superimposition of two basic movements, for example, the continuous application of a contour during a simultaneous uniform transport movement, is very well known from the prior art, this can as such be employed relatively straightforwardly only when the time of the individual contour treatment by means of additional axles, for example, of a laser scanner for engraving, is very brief compared with the passage of the corresponding region through the movement range of the additional axles. The superimposed rapid movement can then be synchronized with the constant main movement—a completely normal process, the application of which nevertheless does need special preliminary planning.

What is required in the case of the present problem, however, corresponds to a virtually uninterrupted throughput of parts with different engravings, with different time requirement and in different sizes, the transport movement in turn having to be matched thereto to the point of the temporary reversal of movement—and all this usually in two dimensions—that is, something which cannot be integrated in an orderly manner, even by the experienced expert, from the currently available modular automation systems of modern control systems. A corresponding versatile solution is as yet unknown.

Besides these limitations of an optimum movement coordination at numerous closely located small partial contours, yet a further problem exists for many measuring machines or machine tools having redundant axles with a translatory action: the background art, to the extent that the underlying problem is dealt with at all, assumes that after every highly accelerated movement the additional axles that are correspondingly leading are eventually overtaken by the base axles again, so that the additional axles are located in their starting position again, usually in the middle of their respective movement range. In particular for such mechanical configurations, in which one or more additional axles are moved by one or more base axles over a surface to be measured or processed, for example, by means of a gantry, there consequently occurs at the edge of the total movement range a region of about half the width of the movement range of the additional axles that normally cannot be reached, so that, for example, a gantry or its range of movement has to be correspondingly wider in order to utilize substantially the same working space as without additional axles.

Consideration has not yet been given to the fact that during a co-ordination movements according to the prior art the base axle swings out as it were beyond the position to be approached, so that a completely reliable function of a machine coordinated in this way is possible only within a range that corresponds overall to the movement range of the base axles less twice the movement range of the actual additional axles. This is explained by the fact that during a movement to an edge of the movement range, in each case the movement range of an additional axle in the opposite direction is needed to compensate for the braking response, so that, for example, the tool is then positioned momentarily at the edge of the additional axle that is located opposite the outer limitation. At the end of the movement, the base and additional axles then balance each other out, i.e. the base axle comes back from the edge so that the additional axle is able to move into its starting position again, whilst the overall position in this axis remains constant. Momentarily, therefore, on each side of the total movement range of base and additional axles allowance is to be made for a "run-out zone" of approximately the movement range of the additional axle, which cannot be utilized as a measuring or processing area. As most additional axles for synchronous redundantly active operation according to the prior art required only a relatively short movement range, this was at best a rather minor problem. But since, however, commensurate with development over recent years, it is becoming increasingly accepted that a relatively large minimum movement range is necessary for an efficient redundantly effective operation, the solution to this sub-problem of overall co-ordination now also has greater relevance.

It is therefore the technical problem of the present invention to avoid the disadvantages of the known movement co-ordination methods for redundant axles having a translatory action of a measuring machine or machine tool and to disclose a co-ordination method that provides an opportunity for the movement range of base and additional axles to be fully utilized even during continuous superimposed movement of the redundant axles and, appropriately modified, also further improves the other movement co-ordination, in particular during processing of numerous closely consecutive, relatively small, separate partial contours.

SUMMARY

Interestingly, both problems, at first glance quite different, can be solved by means of the same method, with just slight adaptations in each case. In order to utilize as fully as possible the total movement range of redundant axles having a translatory action even during continuously superimposed movement of the base and additional axles, the main claim of the present invention provides that as a base axle approaches one of the boundaries of its movement range and during the deceleration of its movement necessitated thereby, up to the point of standstill, the neutral starting point of an axle acting redundantly with respect to this is displaced for further accelerated movements correspondingly towards that edge of the movement range of said base axle, to which edge the total movement is approaching. Said neutral starting point can also be called or regarded as the inner or local zero point of the particular additional axle onto which the movement components acting redundantly to the particular base axles, and generally more highly accelerated, are added. The said displacement superimposed on the total movement, which displacement is effected all in all neutrally with respect to the relative movement between measuring device or tool and the material to be measured or processed, consists in a corresponding movement component of the said additional axle towards its said edge, as compensation of the movement deceleration, up to the point of standstill, of the particular base axle, the closer the base axle and the respective associated additional axle approach the edge of their movement range. Conversely, as the said total movement increasingly recedes from the edge of the total movement range, the local zero point of the said additional axle is displaced towards its middle position again, so that finally the base axle again participates in the movement, the more so the more closely at the same time the set point for the inner zero point of the additional axle corresponds to its neutral starting value.

It is possible to calculate the minimum possible distance (D) of a base axle from the edge of its movement range as a function of the current speed (Vb) of this base axle and its maximum acceleration (Bb), using the expression $D >= Vb2/2Bb$. Transposed, the maximum allowed speed at a given distance (D) is $Vb <= SQRT(2\ D\ Bb)$. (SQRT=square root).

This condition should largely be observed in order despite use of the edge region, as part of the usual working area of a machine, to avoid breaching the boundaries of the movement range of a base axle during a total movement. In order on the other hand to be able to utilize as fully as possible the edge region of the working area even at high measuring or processing speeds, a base axle must approach the boundary of its movement range also correspondingly in dependence on speed.

Basically, the following is true: If Pb1 were the given position of the base axle according to the prior art and Pb2 the position resulting from the deceleration according to the invention, then the position of the inner zero point of an additional axle acting redundantly thereto is calculated corresponding to Nz2+Pb2=Nz1+Pb1 to Nz2=Nz1+Pb1=Pb2. The co-ordination of the redundantly acting axles can thus be effected basically corresponding to prior art, but with the additional requirements that as the base axle approaches a boundary of its movement range its speed is limited to the above-described extent, and the resultant omitted movement component is added to the redundantly acting additional axle.

By this means, the entire working space attainable jointly by base and additional axle, under separate control, becomes available, even for the joint operation with constant acceleration-dependent division of the movement.

To illustrate a simple example for a single total axle: at the start of this approach, let it be assumed that both the base axle and also the additional axle are positioned at the midpoint of their movement ranges of 1000 mm and 100 mm respectively and are stationary. Let this also be the zero point of the working space. For a total movement to the right (+) at constant desired speed, both axle types now accelerate simultaneously, until the said speed is reached. Up to this point, the base axle has reached only a slight fraction of the desired speed. Whilst the base axle now accelerates further, the speed of the additional axle decreases correspondingly. When the speed of the base axle reaches the desired speed, the additional axle stops, within its movement range, and relatively far to the right of the midpoint. According to the generally valid prior art, in this example the additional axle now moves towards the middle position again—for further periods of acceleration in one of the two directions. For that purpose, the base axle must be accelerated yet further, in order in respect of the total movement to permit a neutral movement of the additional axles, back to the middle (see also the prior art in this connection, e.g. EP 1 294 544 B1). Let it be assumed further that the movement is to stop 10 mm before the extreme right edge attainable, that is, at position +490 mm. If, with an assumed range of 100 mm, the additional axle were now to remain in its neutral starting position, this position would be 40 mm outside what could normally be attained. The movement would therefore not normally be feasible. According to the invention, the control system now displaces the neutral starting point of the additional axle ever further towards its right edge, exactly opposite to the component that is derived from the movement of the base axle, in order to avoid breaching its own area boundary, which here makes itself felt as a deceleration of the base axle. Shortly before the total movement reaches the planned stopping point, the additional axle is already moving at the desired speed, which it alone now assumes, towards its right edge, the base axle in the meantime already being in its end position. Finally, the additional axle decelerates appropriately to the stopping point. As the base axle in this example has moved 40 mm less far to the right than it would have done (if it were physically possible) without the deceleration according to the invention, the neutral starting point of the additional axle is now displaced by 40 mm to the right, that is, 10 mm away from the actual right-hand edge. Accordingly, there is now no compensatory movement either, corresponding to the prior art.

Preferably, the said displacement of the neutral starting point correspondingly reaches the said edge of the movement range of the additional axle substantially exactly when the total movement has reached the corresponding edge of the working space in the respective total axis. This displacement is therefore possible without adversely affecting the other movement to be performed, as a further highly accelerated movement beyond the boundaries of a working space is neither possible nor necessary, which is why no further space need be left for a highly accelerated advance of the additional axles. Note that, as in known methods for movement co-ordination of redundant axles having a translatory action, there is a correlation between the maximum movement speed (Vbmax) usable with this method, the accelerating ability of the base axles (Bb) and the length of the movement range of the additional axles (Sz). A closer examination of this correlation shows, however, that with virtually every method that can be supplemented in accordance with the invention, it follows entirely without constraint that the maximum values of Vbmax and minimum values of Sz and Bb, which already result from the requirement of continuously possible use of the additional axle with its particular acceleration, include the possibility of using a method according to the invention, up to these limit values. At still higher movement speeds on the other hand, even in known methods, precautionary measures are in turn needed in order to avoid discontinuous movement sequences that are no longer precisely controllable, which measures can normally be combined likewise transparently, i.e. with no special consideration, with the method according to the invention. The text will return to exceptions to this hereafter.

With every machine operating with a redundant axle arrangement having a translatory action, at some point or other of the control or regulation the division of the set parameters for the redundantly acting partial axles will take place. This can take place, for example, after a division into different highly accelerated components of a movement (Bkb, Bkz) from a control, as is explained preferably in the described examples of the applicant of the present invention relating to the prior art. In order to achieve a modification in accordance with the invention of the movement of a base axle and the corresponding displacement of the neutral starting position of a redundantly acting additional axle, in such configurations the positioning data necessary for the said modification and displacement are preferably added on to the corresponding movement components (Bkb, Bkz) at this point, wherein this data to be additionally added on compensates exactly for both movement components, so that the resulting movement of a measuring device or a tool with respect to a material to be measured or processed is not affected hereby. Depending on the details of the respective co-ordination method to be used for the actual measuring or processing paths, in addition to the position data also speed data and acceleration data are optionally to be adapted.

Basically, the method according to the invention can also be realized by means of a closed loop circuit connected downstream of the actual control system, if the facility exists, corresponding to the positional conditions already described, to feed suitable signals for displacement of the zero point of the additional axle into the corresponding closed loop circuit. See in this connection as an example EP 1 688 807 A1 (Scholich-Tessmann), FIG. 6, connection 61, description paragraphs [9], [10], [40], claims 4 and 11. Even if in that publication a different use of what is known as the follow-up offset is intended, then this would still be an example of a possibility for a modification according to the invention of the movement of a base axle and the corresponding compensatory displacement of the inner zero point of a redundantly acting additional axle by means of a closed loop circuit.

Since the data of the existing positioning system is normally used as a starting point in the case of a substantially position-dependent activation or execution of method-related operation sequences in a measuring machine or machine tool, as regards the particular overall co-ordination method in the case of the limit values of the working space it is usually a matter of suitably entered or pre-set values in a data-processing device, that is, preferably a CNC control system. Such values can in principle be set arbitrarily, so that also every other arbitrary n-dimensional sector of the physical working space can be defined as boundary, wherein (n) stands for the number of redundant axle combinations having a translatory action.

This provides the opportunity to allow the corresponding inventive properties of the method to become effective for arbitrary said sectors of the working space, so that, for example, such a sector can also be positioned consistent with a certain separate movement path or partial contour. This would then correspondingly restrict the movement of all participating axles, as though this sector represents the physical limit of potential movements. The most important advantage of such a procedure lies in the fact that the movement component of the mostly relatively inert base axles concerned is thus limited to the minimum amount necessary, without restricting the movement dynamics, as long as the movement path to be covered remains within these limits.

Should a thus-defined temporary working space be so small in an axial direction that according to the previously accepted rules a displacement of the inner zero point in both directions could ensue, then preferably the distance to the edge that is located closer to the current desired position is the decisive factor. If the distance is the same or at least substantially the same, the current direction of movement decides or the inner zero point of the said additional axle is displaced to a middle position.

The inner zero point of an additional axle is also preferably displaced to a middle position when the said temporary working space, in the particular axial direction, is located within the movement range of the particular additional axle.

In particular, all this is an advantage when the said sector comprises a series of relatively small separately executable path sections, so that the section proportion of the base axles in the positioning movements, and hence the amount of time and speed between the sections, is minimized.

When the boundaries of all separable path sections are established and stored in a corresponding data structure, as is already known from the prior art, with minimum computing time and expenditure of time the common boundaries of an arbitrary group thereof can be determined and applied as said values to limit a respective suitable temporary working space. If this group and the resulting boundaries are continuously up-dated in such a way that specifically the sections whose processing is directly imminent are admitted to the group for a certain period in advance, and the sections that have already been processed leave, the result is a continuously up-dated adaptation of the temporary working space and thus a relatively low-acceleration and minimized adjustment movement of the base axles, the additional axles always being given the optimum starting position for a maximum size, highly accelerated movement component.

Compared with the prior art, this method can also be used advantageously when otherwise no synchronous redundantly effective division of the movement path for carrying out measurements or treatment processes takes place between the base and additional axles, but merely an adaptation according to the invention of the position of the base axles and a corresponding compensation of the additional axles with respect thereto, corresponding to continuously up-dating limit values of a temporary working space; this has the effect that often relatively large regions of closely spaced, relatively small partial contours can be processed, without pauses caused by chronologically separate re-positioning of the base axles. The machines and Methods 1 and 2 of the applicant of the present invention which have already been mentioned with respect to the prior art can also be optimized again by combination with the present method: a machine optimized from the outset for Method 1, with especially high speeds of the additional axles, can use these for rapid position change in an optimum manner, as the separate path sections and partial contours are located more frequently within the range of the additional axles. Method 2 can also profit from the same advantage, wherein for the same reason the acceleration of the additional axles needs to be limited less frequently, since unnecessary superimposed movements of base and additional axles are better avoided, than without the present method.

At any rate, it is advisable to test and optionally use the additional practicality of already known and customary methods, which can also be used to optimize the efficiency of conventional machines without additional axles, for example to determine the sequence of separate path sections or partial contours in preparatory work, and at the same time if possible to see that the partial contours to be processed are aligned transversely to the shortest additional axle, as these are further measures that may additionally provide favorable preconditions for the efficiency of the method according to the invention.

In the simultaneous use of methods for improving movement co-ordination in machines with redundant axles having a translatory action, a few principles should be observed in order to achieve an especially high overall efficiency and to avoid counter-productive effects:

Should the Method 1 already mentioned be used together with the present invention, then in principle it suffices if the data relating to the inner positions of the redundantly acting partial axles and the particular zero point displacements for the following control and/or regulating stages are available in parallel, as the inner zero point displacement according to the invention optimizes as needed merely the in each case temporarily usable movement range of the additional axles and is transparent with respect to the actual desired position data of the particular measurement or processing. This applies not quite so straightforwardly, however, in relation to speeds and accelerations, as the inner movement of each partial axle necessary for zero point displacements at the same time also stresses this axle correspondingly, and together with the desired data for actual movement between measuring device or tool and material to be measured or processed, wherein overshooting of limit values is to be avoided. Since, however, in turn the greatest stress on the base axles caused according to the invention always acts opposite to the stress caused by the desired path—see also the example at the beginning of the description—i.e. actually tends to act as relief or temporary forestalling—this is negligible. Correspondingly, however, the additional axle must in some situations accomplish an additional movement component and its acceleration potential is temporarily correspondingly reduced, without, however, the previously valid maximum necessary speeds being exceeded. The "worst case" here would be a situation in which, conditional on position, on the one hand an approach according to the invention of the additional axle towards the edge of a working space is just beginning to become effective and parallel thereto short desired path sections repeatedly point in the same direction and immediately in the opposite direction again. The simplest way to allow for this is, analogous to the situation of an additional axle supported by the particular base axle, by simply subtracting the acceleration component required for compensating the base axle generally from the acceleration potential of the additional axle and making allowances for this in the corresponding machine data of an open-loop control system and/or closed loop control system or in simulation calculations carried out in advance or during the process and the like. The rule works here inversely, however, as with reference to a movement to desired positions:

A supported additional axle requires no additional absolute acceleration here, whereas an additional axle opposite to the base axle does. But this is to be further differentiated, on account of the relative acceleration, which is to be allowed for in every case and in detail in dependence on the particular drive system of the additional axle. For example, in the case of a supported additional axle, a moving coil drive would have to compensate only the friction-induced force components to compensate for a movement according to the invention of the base axles (in addition to the component of the desired movement), whereas in the case of a ball screw spindle, all rotating masses, even during an "internal" movement, would have to be correspondingly accelerated.

Since the particular acceleration potential of the additional axle will mostly be an order of magnitude higher than that of the associated base axle, this can be carried out usually without appreciable disadvantages for the overall efficiency.

On the other hand, it is also not absolutely necessary to use an exactly constant acceleration value for the additional axles, so that in all the said steps the maximum possible values, in each case dependent on position, can also be used, so far as the particular type of control or pre-processing allows an up-dated adjustment or consideration of the acceleration. Another problem occurs when, in accordance with a refinement of the said Method 1, a speed-dependent displacement of the inner zero point of an additional axle is also taken into account. In that case, two competing adjustments have to be dealt with, which cannot easily become simultaneously efficiently effective.

If the first example dealt with in the description is now modified such that a zero point displacement also results from the speed, then the additional axle, by movement of the base axle, could now in one situation already be on its way towards the edge, which allows no further adjustment whatsoever, with the result that a braking of the base axle as the boundaries according to the invention towards the edge are exceeded can no longer be compensated by the additional axle, so that either the acceleration potentials of the base axle become decisive for further movements in this region, or a downright "crash" would occur. This means that even before the additional axle enters the edge zone in which, with its assistance, compensation is necessary, the movement clearance for this compensation must be available. However, this is inconsistent with the aim of achieving a maximum length "catching-up path" for the base axle in the opposite direction by means of speed-dependent displacement of the inner zero point of the additional axle.

In principle, two relatively simple solutions to this conflict are possible:

In the upper desired speed range of the machine in question, from a speed at which a said extended "catching-up path" (longer than half the movement range of the additional axles) is needed for the base axles, the working space is correspondingly reduced in size from the edges and the machine is operated according to the improved Method 1. Below this speed, the machine is then additionally or only operated in accordance with the present invention. Alternatively, speed zones in which a smooth transition between these modes of operation takes place could be defined.

It is important, however, to bear in mind that this problem occurs only at the physical limits of the working space, so that the improved inventive method, for example, within the above-described "high speed zone", can be used without problems, for example, by adding the inner zero point displacements of an additional axle generated by the two sub-methods and reducing them to the allowed maximum value. An "over-shooting" of the base axles, which, as described, would not be, allowed in the edge region, would do no harm here, and the advantages according to the invention of both methods could thus take effect.

The combination with the said Method 2 is both expedient, as far as maximum utilization of the physical working space of a machine is the important point, and also, as a possible reference method in conjunction with a refinement of Method 2 in which a simulation comparison of methods is used, suitable for deciding which sections of a trajectory are to be processed with which method variants.

The type of base axles, and also additional axles, of machines that are operated in accordance with the invention can be achieved mechanically in a variety of ways. Linear axles, hollow-shaft motors, rack and pinion drives or ball screw spindles are generally used for base axles, whilst for additional axles, depending on the movement range required and the scale of the application, in addition to linear drives and possibly directly driven ball screw spindles, use can also be made of piezoelectric, electrodynamic ("voice coils"), hydraulic or pneumatic drives.

The use of machine parts rotatable about an axis or movable using parallel kinematics as a correspondingly linearly acting additional axle within a suitable angular range, such as, for example, pivotable laser cutting heads or milling heads movable using parallel kinematics, is just as possible.

A measuring machine or machine tool can advantageously be designed in accordance with the invention, for example, for shipbuilding or aircraft construction for measuring and processing very large components in great detail and complexity, or for more mundane dimensions, for example, of the size of car bodies, washing machines or circuit boards for electronic circuits, down to dimensions of centimeters or fractions of millimeters, for the dimensions of a workpiece to be measured or processed in micro system engineering, micro electronics or nanotechnology.

The basic problem—the size of an undivided working space in relation to the details to be considered on the one hand, and on the other hand ever higher measuring or processing speeds, with a movement range of responsive additional axles having a redundant action with respect to slow base axles that has only limited potential for enlargement—is tending to increase and hence at the same time there is an increasing need for constantly available accelerations with preferably continuous measuring and processing speeds at complex contours and structures and thus on correspondingly complex curved paths. In this connection, the invention allows an improved use of the working space and/or the more efficient handling of measuring and processing paths that contain numerous relatively small and closely spaced and separately executable path sections.

Processing methods for which a method according to the invention is especially suitable are welding, cutting, milling, engraving, marking, application of complex contours and structures to rather flat materials, such as sheet metals, plastics materials, glass, ceramics, wood and textiles. Likewise, rapid prototyping is also a suitable application, in particular methods in which layers are cut, material is applied to small areas or has to be processed with an energy beam oriented as perpendicular to the material as possible, for example, to obtain an input of energy that is as uniform and accurately reproducible as possible. Furthermore, the precise processing of very small structures or the precise application and removal of very fine details at high speed are applications of the present invention that are just as possible as the measurement and monitoring in the said regions; these applications are to be understood only as examples and are not intended in any way to represent a exhaustive enumeration of possible applications of the invention.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
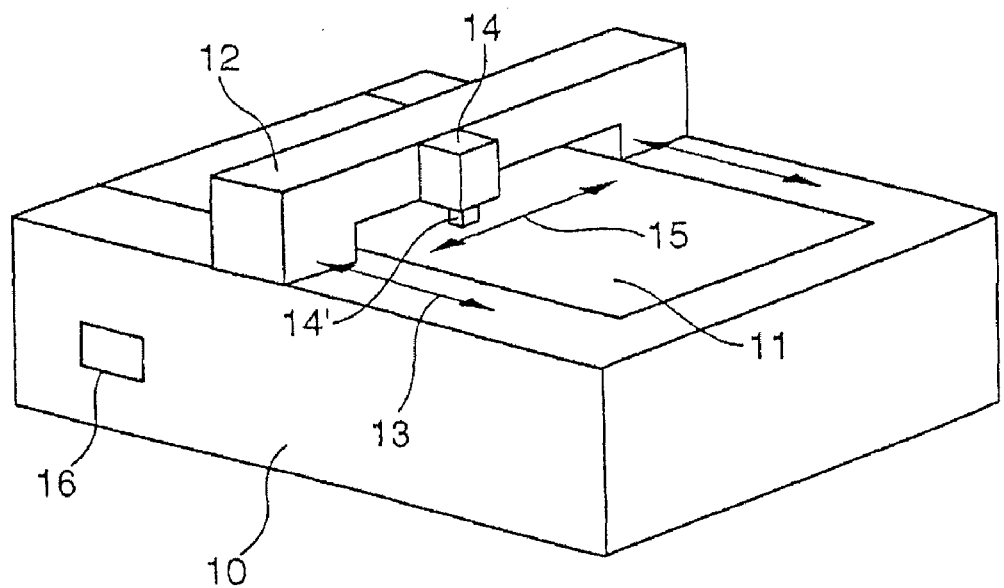
FIG. 1 shows a machine tool having a tool movable in two axial directions and an additional axle.

FIG. 1 illustrates a machine tool 10 in which a workpiece 11 is arranged to be stationary. A gantry 12 is movable along the axial direction 13. Arranged on the gantry 12 is a device 14 on which a tool holder 14' capable of holding a tool is in turn arranged. The device 14 (and hence the tool holder 14' with tool) is movable in the axial direction 15. The tool holder 14' is movable relative to the device 14 likewise in the axial direction 13. It is apparent from FIG. 1 that the tool holder 14' (with tool) has a lower mass than the device 14, which can be called a sliding carriage. The gantry 12 with associated drives represents a first partial axle acting in direction 13 and is called the base axle, whilst the tool holder 14' with associated drive represents a second partial axle, the additional axle, acting in the axial direction 13. The base axle has a larger movement range and lower acceleration than the additional axle. The movements in the axial directions 13, 15 are controlled by a control system 16.

Figure 2:
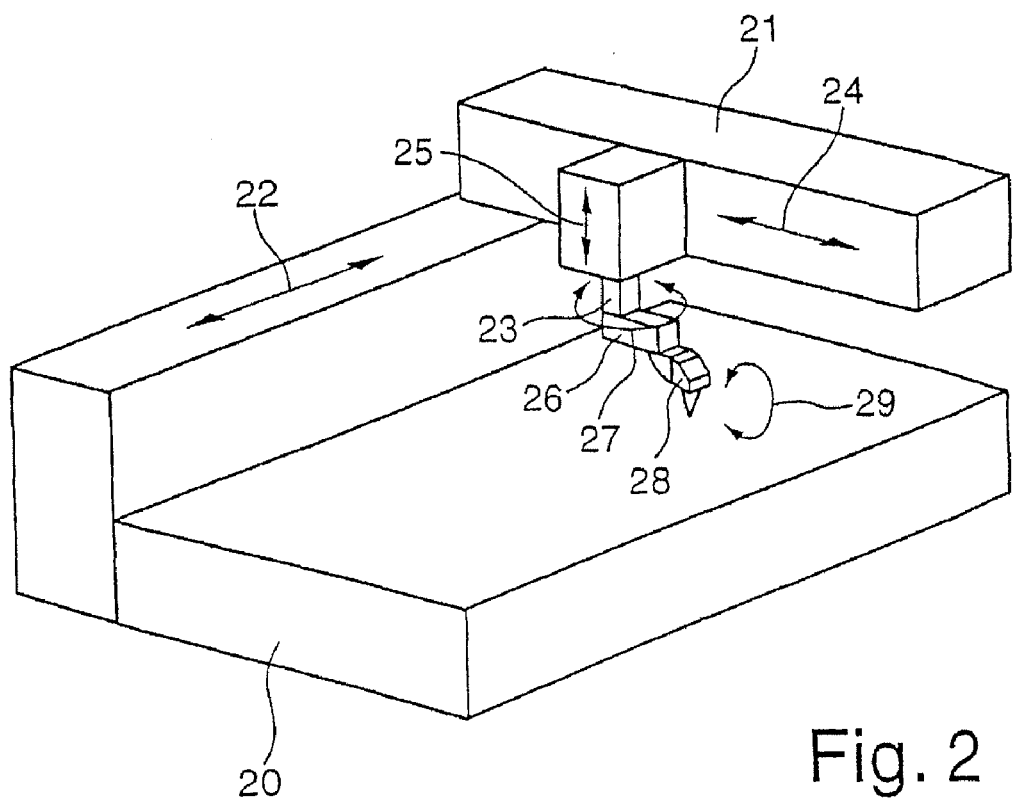
FIG. 2 shows a machine tool having five axial directions.

FIG. 2 illustrates a machine tool 20, in which an arm 21 is movable along the axial direction 22. A device 23 is movable along the arm 21 in the axial direction 24. The device 23 is additionally movable in the axial direction 25. The X, Y and Z directions of a Cartesian co-ordinate system are determined by the axial directions 22, 24, 25. An extension arm 26 is rotatable in axial direction 27. A laser cutting head 28, which in turn is rotatable in the axial direction 29, is arranged as the tool on the extension arm 26.

In a small movement portion the movement of the laser cutting head 28 is substantially parallel to the axial direction 22, so that a movement of the head 28 in one region can cause a translatory movement parallel to the movement of the arm 21 in the axial direction 22 and therefore the laser cutting head 28 together with its drive can be regarded as a (translatory) additional axle.

Figure 3:
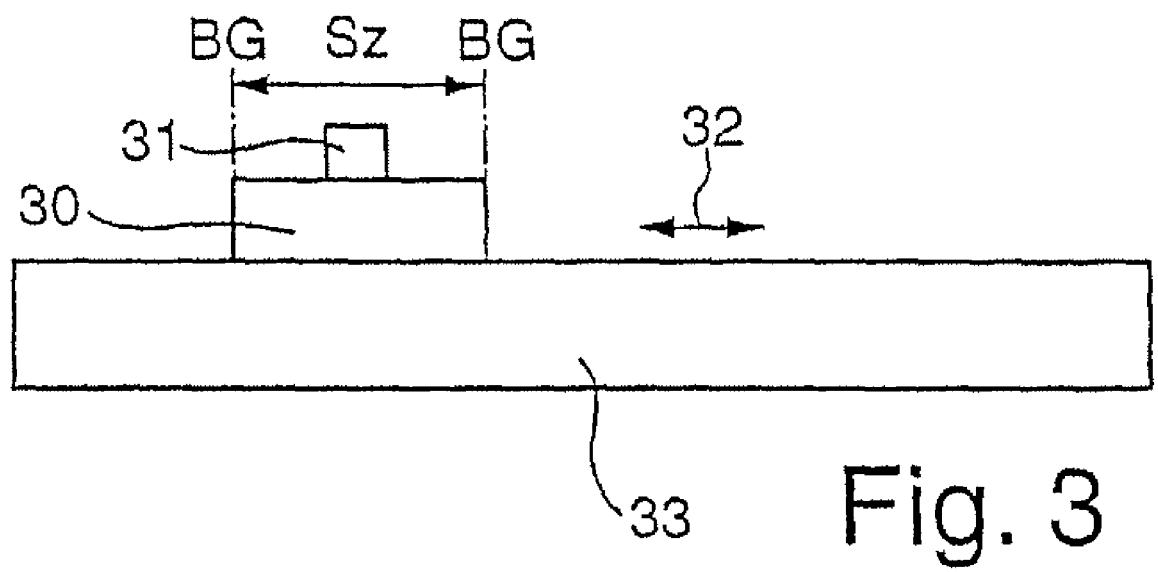
FIG. 3 is a highly schematic representation of a base axle and an additional axle.

FIG. 3 shows, highly schematicized, a sliding carriage 30, which is movable relative to the guide 33 and represents a base axle or part of one. Arranged thereon is a device 31, which represents an additional axle or part of one. Both the sliding carriage 30 and the device 31 can be accelerated in the double arrow direction 32. At the same time, the sliding carriage 30 can be accelerated relative to the guide 33 at acceleration Bb (acceleration of the base axle) and the device 31 can be accelerated relative to the sliding carriage 30 with an acceleration Bz (acceleration of the additional axle). A tool or a measuring device fixed to the device 31 can be accelerated at least with an acceleration Bz with respect to a workpiece. The broken lines BG represent the boundaries of the movement range Sz of the additional axle.

A number of embodiments of the invention have been described. Nevertheless, it will be understood that various modifications may be made without departing from the spirit and scope of the invention. Accordingly, other embodiments are within the scope of the following claims.

What is claimed is:

1. A method for the optimized movement co-ordination of measuring machines or machine tools having redundant axles having a translatory action, wherein the redundant axles having a translatory action form linearly movable parts of a total movement device, for at least two-dimensional total movement of measuring machines or machine tools relative to a material to be scanned or to be processed with any desired methods, wherein a redundant translatory movement is considered to be when rotatory or parallel kinematically acting partial movement devices, in addition to their movement options or exclusively within an application-dependent movement range, is used for a redundantly translatory movement of a measuring machine or a tool, wherein partial axles each movable over a first distance, called base axles here, permit a accelerated partial movement substantially across the entire measuring or processing space, and the partial axles each movable over a second distance that is shorter than the first distance, called additional axles here, perform movement components of a total movement, which require an acceleration beyond a maximum established or stipulated for the base axles, wherein all partial axles acting in the same direction constitute an overall axis, wherein the overall co-ordination of all axles takes place directly during a measuring or processing operation, or in a section-wise pre-processing during a measuring or processing operation, or as part of a complete pre-processing of an entire measuring or processing operation, and at standstill or during an unaccelerated movement in the overall axis, an additional axle assumes substantially the position of a neutral starting point, wherein addition of a higher accelerated movement components of a total movement acting redundantly with respect to the base axles to the neutral starting point produces the position of an additional axle in its own movement range, and wherein, when approaching positions, within the limits of a measuring or processing path, which would not be achievable in the case of a fixed neutral starting position, the base axles decelerate correspondingly in order to avoid breaching the boundaries of their working range, wherein by corresponding simultaneous displacement of the neutral starting point of the additional axles, the movement component of the base axles missing from the total movement is compensated, and thus substantially the movement range of the base axles and the movement range of the respective redundantly active additional axles, added, produce a working space available in the overall axis.

2. The method according to claim 1, wherein the said deceleration of a base axle commences at the latest when the distance of the said base axle from the edge of its movement range approaches or reaches $Vb^2/2Bb$, where Vb stands for the speed and Bb stands for the acceleration each time of the base axle.

3. The method according to of claim 1, wherein the said displacement of the neutral starting point reaches substantially the said edge of the movement range of the additional axle when the total movement reaches the corresponding edge of the working space in the particular overall axis.

4. The method according to claim 1, wherein the movement components balancing each other out in a control or pre-processing can comprise position, speed and acceleration data or signals.

5. The method according to claim 4, wherein the said movement components are added to control output data or signals and thus towards the controlled movement device, no separate outputs for these movement components are provided.

6. The method according to claim 4, wherein the said movement components are fed via separate data outputs or signals to a controlled movement device so that consideration of these movement components is effected via arrangements of the movement device that are specifically provided for that purpose.

7. The method according to claim 1, wherein the boundaries of the working space of the said total movement device can be adjusted as desired within the limits of its added physical movement ranges in each overall axis and also the boundaries of the movement range of each base axle can be adjusted and these boundaries are alterable during a measurement or processing.

8. The method according to claim 7, wherein, with the setting up of the said boundaries of the working space, the adjustable boundaries of the movement range of the base axles are automatically adjusted in such a way that they are arranged substantially centrally between the said set boundaries of the working space, with the movement range of the base axles corresponding to a width of the working space less the movement range of the additional axles.

9. The method according to claim 7, wherein the geometric boundaries of separately executable movement sections are determined by data technology and in respect of a total measurement or processing are stored in a list in their sequence, and from arbitrary list sections common geometric limit values are formed and set temporarily as said boundaries of the working space.

10. The method according to claim 9, wherein the said list sections begin at a list entry whose associated path section is currently being executed and includes one or more immediately following list entries, wherein after each completion of a separate path section the list section is correspondingly displaced in the list, and from this list section common geometric limit values are formed and set temporarily as said boundaries of the working space.

* * * * *

UNITED STATES PATENT AND TRADEMARK OFFICE
CERTIFICATE OF CORRECTION

PATENT NO. : 8,260,443 B2  Page 1 of 1
APPLICATION NO. : 12/643332
DATED : September 4, 2012
INVENTOR(S) : Andreas Ehlerding It is certified that error appears in the above-identified patent and that said Letters Patent is hereby corrected as shown below:

On the Title Page, Item (75), delete "Seeize (DE)" and insert --Seelze (DE)--.

Column 15, line 1 (Claim 3, line 1), after "according to" delete "of".

Signed and Sealed this
Twenty-seventh Day of November, 2012

David J. Kappos
*Director of the United States Patent and Trademark Office*